(12) United States Patent
Kobayashi et al.

(10) Patent No.: US 8,692,939 B2
(45) Date of Patent: Apr. 8, 2014

(54) METHOD AND APPARATUS FOR IMPROVING IMAGE QUALITY

(75) Inventors: Michio Kobayashi, Tokyo (JP); Reiichi Kobayashi, Tokyo (JP)

(73) Assignee: NEC Viewtechnology, Ltd., Tokyo (JP)

(*) Notice: Subject to any disclaimer, the term of this patent is extended or adjusted under 35 U.S.C. 154(b) by 0 days.

(21) Appl. No.: 13/486,855

(22) Filed: Jun. 1, 2012

(65) Prior Publication Data

US 2012/0242903 A1    Sep. 27, 2012

Related U.S. Application Data

(62) Division of application No. 11/522,418, filed on Sep. 18, 2006, now abandoned.

(30) Foreign Application Priority Data

Oct. 18, 2005  (JP) .................................. 2005-302935

(51) Int. Cl.
*H04N 7/00* (2011.01)
*H04N 11/00* (2006.01)
*H04N 5/00* (2011.01)
*H04N 5/57* (2006.01)
*H04N 3/14* (2006.01)
*G06K 9/40* (2006.01)

(52) U.S. Cl.
USPC ........... 348/627; 348/497; 348/607; 348/687; 348/790; 382/263; 382/264

(58) Field of Classification Search
USPC .......... 348/497, 607, 625, 687, 790; 382/263, 382/264
See application file for complete search history.

(56) References Cited

U.S. PATENT DOCUMENTS

| | | | |
|---|---|---|---|
| 5,068,725 A * | 11/1991 | Ogawa et al. | ............. 348/437.1 |
| 5,107,340 A | 4/1992 | Hirata et al. | |
| 5,115,313 A | 5/1992 | Isobe et al. | |
| 5,224,483 A | 7/1993 | Lipschutz | |
| 5,278,648 A | 1/1994 | Power | |
| 5,534,935 A * | 7/1996 | Kawai et al. | ................. 348/448 |
| 5,646,697 A | 7/1997 | Kurashige | |

(Continued)

FOREIGN PATENT DOCUMENTS

| | | |
|---|---|---|
| JP | 61-296880 A | 12/1986 |
| JP | 5-328172 A | 12/1993 |

(Continued)

OTHER PUBLICATIONS

European Search Report dated Feb. 5, 2007.

(Continued)

*Primary Examiner* — Brian Yenke
(74) *Attorney, Agent, or Firm* — McGinn Intellectual Property Law Group, PLLC

(57) ABSTRACT

A method of improving an image quality of a video signal, which is supplied on a frame-by-frame basis, includes extracting low frequency components from a video signal of an n-th frame, where n is a natural number excluding zero, subtracting the extracted low frequency components from a video signal of an (n+m)th frame to produce high frequency components, where no is a natural number excluding zero, and adding the produced high frequency components to the video signal of the (n+m)th frame. The extracted low frequency components include a horizontal component and a vertical component.

19 Claims, 12 Drawing Sheets

(56) References Cited

U.S. PATENT DOCUMENTS

| | | | |
|---|---|---|---|
| 5,712,691 A | 1/1998 | Brennesholtz | |
| 5,822,008 A | 10/1998 | Inoue et al. | |
| 5,892,551 A | 4/1999 | Uematsu | |
| 5,903,680 A | 5/1999 | De Haan et al. | |
| 6,442,201 B2 | 8/2002 | Choi | |
| 6,570,673 B2 | 5/2003 | Kishimoto | |
| 6,650,792 B1 | 11/2003 | Aida et al. | |
| 7,009,662 B2 | 3/2006 | Ojo et al. | |
| 7,061,546 B2 | 6/2006 | Wischermann | |
| 7,505,084 B2 | 3/2009 | Kobayashi et al. | |
| 7,518,660 B2 | 4/2009 | Kobayashi et al. | |
| 7,538,822 B2 | 5/2009 | Lee et al. | |
| 7,570,306 B2 | 8/2009 | Zhou et al. | |
| 7,602,447 B2 | 10/2009 | Arici et al. | |
| 2002/0149685 A1 | 10/2002 | Kobayashi et al. | |
| 2003/0007100 A1 | 1/2003 | Ojo et al. | |
| 2004/0017343 A1 | 1/2004 | Adachi et al. | |
| 2004/0017517 A1* | 1/2004 | Alvarez | 348/700 |
| 2004/0218834 A1 | 11/2004 | Bishop et al. | |
| 2005/0094890 A1 | 5/2005 | Wang | |
| 2005/0162566 A1 | 7/2005 | Chuang et al. | |
| 2006/0098122 A1 | 5/2006 | Kobayashi et al. | |
| 2006/0119617 A1 | 6/2006 | Toyooka et al. | |
| 2006/0164555 A1 | 7/2006 | Klompenhouwer et al. | |
| 2007/0274397 A1 | 11/2007 | Kwaaitaal-Spassova et al. | |
| 2009/0207186 A1 | 8/2009 | Toyooka et al. | |

FOREIGN PATENT DOCUMENTS

| | | | |
|---|---|---|---|
| JP | 8-331421 A | 12/1996 |
| JP | 2001-265298 A | 9/2001 |
| JP | 2002-290772 A | 10/2002 |
| JP | 2003-270669 A | 9/2003 |
| JP | 2004-46886 A | 2/2004 |
| JP | 2006-184896 A | 7/2006 |

OTHER PUBLICATIONS

Gerard de Haan, et al. "An Overview of Flaws in Emerging Television Displays and Remedial Video Processing" IEEE Transactions on Consumer Electronics, vol. 47, No. 3, Aug. 2001, pp. 326-334, XP002280684.

Michiel A. Klompenhouwer, et al. "LCD Motion Blur Reduction with Motion Compensated Inverse Filtering" May 25-27, 2004, SID International Symposium Digest of Technical Papers, vol. 35 PRT 2, May 26, 2004, pp. 1340-1343, XP001222865.

Japanese Office Action dated Apr. 21, 2010, with a partial English translation.

"Interface," CQ Publishing, Jun. 1998, pp. 73-74.

"Special Feature: Flat Panel Wars-Second Part," Nikkei Electronics, Nov. 18, 2002, pp. 110-118.

"Introduction to Digital Signal Processing," CQ Publishing, first edited in 1989, pp. 75-77.

* cited by examiner

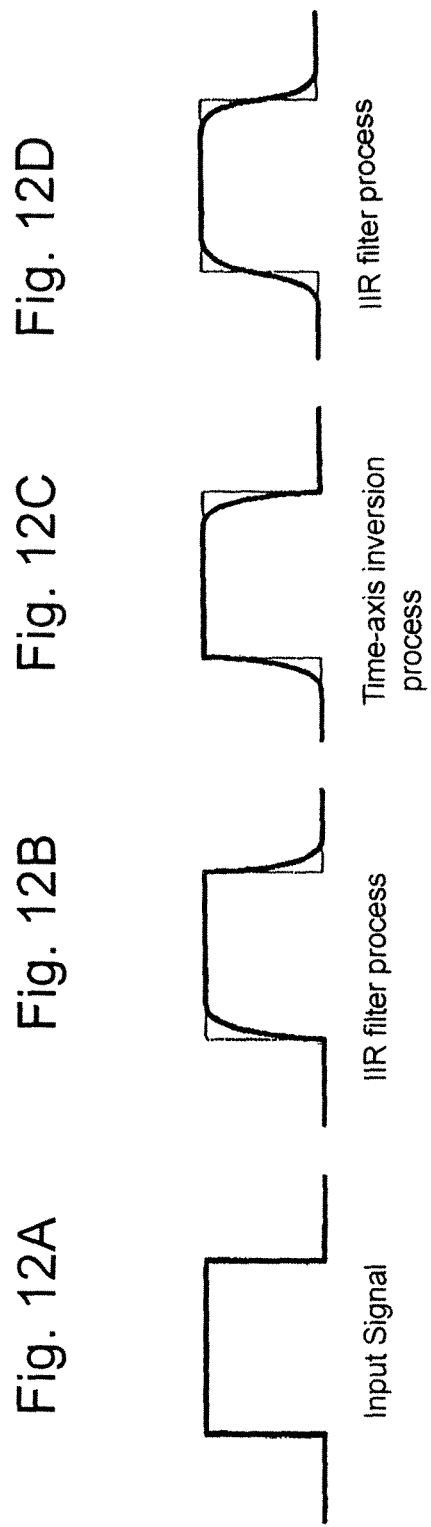

Writing process

Reading process

"METHOD AND APPARATUS FOR
IMPROVING IMAGE QUALITY

The present application is a Divisional Application of U.S. patent application Ser. No. 11/522,418, filed on Sep. 18, 2006 now abondoned, which is based on and claims priority from Japanese patent application No. 2005-302935 filed in Japan Patent Office on Oct. 18, 2005, the contents of which are hereby incorporated by reference.

BACKGROUND OF THE INVENTION (1) Field of the Invention

The present invention relates to a method and apparatus for improving the image quality of a display apparatus which may have a low response speed, such as a liquid crystal display apparatus.

(2) Description of the Related Art

For displaying a moving image on a liquid crystal display apparatus, the response time of a liquid crystal panel is preferably limited to one frame period (16 ms) or shorter. Some systems utilize an overdrive or an OCB (Optically Compensated Bend) liquid crystal technique in order to accomplish such a reduced response time.

The response time of the liquid crystal panel is generally represented by the sum of the time required to change the display state from a fully black image to a fully white image, and the time required to change the display state from a fully white image to a fully black image. The employment of the overdrive and OCB liquid crystal techniques has resulted in the provision of liquid crystal panels which have a response that is less than 16 ms.

However, even if the response time of the liquid crystal panel can be reduced to 16 ms or less, a retinal after-image phenomenon causes a blurred moving image. A blur of a moving image caused by a retinal after-image refers to a phenomenon in which, when a rapidly moving image is displayed, the moving image appears to be a blurred moving image because a retinal after-image of an image of a current frame is overlaid on an image of the next frame. This blur in a moving image due to retinal after-images is particularly conspicuous in a hold-type drive display apparatus which holds an image through one frame period.

Therefore, a panel driving apparatus has been provided for controlling the blur in a moving image due to the retinal after-image. This is a pseudo-impulse liquid crystal panel driving system in which a period of time, in which a panel is not illuminated with lights, is set in a period during which one frame is displayed. Details of the pseudo-impulse liquid crystal driving system are described in JP-A-2003-270669 (hereinafter called "Patent Document 1), and "Special Feature: Flat Panel Wars—Second Part," Nikkei Electronics, No. 2002/11/18, pp. 110-118 (hereinafter called "Non-Patent Document 1"). According to this pseudo-impulse liquid crystal panel driving system, a fully black image is inserted into a frame period to reduce a retinal after-image and to restrain the blur in a moving image.

However, in the pseudo-impulse liquid crystal panel driving system as described in Patent Document 1 and Non-Patent Document 1, since the panel does not emit light during the black display duration, a problem arises that the luminance is correspondingly reduced. While Non-Patent Document 1 describes a solution for the problem of reduced luminance by increasing the numerical aperture of the panel, such a solution, involving a modification to the structure of the panel, will be expensive.

SUMMARY OF THE INVENTION

It is a purpose of the present invention to provide a low-cost image quality improving apparatus which is capable of solving the aforementioned problem, and of restraining a blur in a moving image without reducing the luminance.

To achieve the above purpose, the image quality improving apparatus of the present invention is configured to extract high frequency components associated with a video signal of an n-th frame (n being a natural number), and to add the extracted high frequency components to a video signal of an (n+m)th frame (m being a natural number).

In a hold-type drive display apparatus, a rapidly moving portion of an image may blur (e.g., halation of a moving image) due to a reduction in high frequency components of the moving image. In the present invention, however, high frequency components associated with the video signal of an n-th frame, for example, are added to a video signal of an (n+1)th frame, so that the high frequency components of the video signal of the (n+1)th frame may be increased by the added high frequency components of the video signal of the n-th frame. In this way, the sense of halation may be restrained in a moving image.

As described above, the present invention is advantageous in that the sense of halation in a moving image can be restrained by a simple configuration without requiring any solution which involves a modification to the design of devices for increasing the numerical aperture and the like.

Also, the present invention need not create a time zone in which a panel does not emit light during a period in which one frame is displayed, as does a pseudo-impulse liquid crystal panel driving scheme. Advantageously, the luminance is higher than that of the pseudo-impulse liquid crystal driving scheme by a fraction that results from the elimination of the time zone in which the panel does not emit light.

The above and other purposes, features, and advantages of the present invention will become apparent from the following description with reference to the accompanying drawings which illustrate examples of the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 12A is a waveform chart of an input signal;

FIG. 12B is a waveform chart representing a signal waveform when the signal waveform shown in FIG. 12A has undergone IIR filtering processing;

FIG. 12C is a waveform chart representing a signal waveform when the signal waveform shown in FIG. 12B has undergone a time base inversion;

FIG. 12D is a waveform chart representing a signal waveform when the signal waveform shown in FIG. 12C has undergone IIR filtering processing;

DETAILED DESCRIPTION OF THE EXEMPLARY EMBODIMENT(S) OF THE INVENTION

Figure 1:
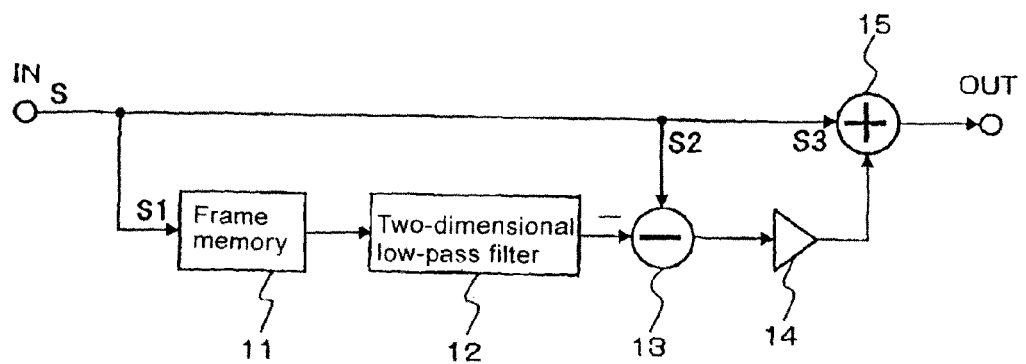
FIG. 1 is a block diagram illustrating the general configuration of an image quality improving apparatus according to one exemplary embodiment of the present invention.
Figure 2:
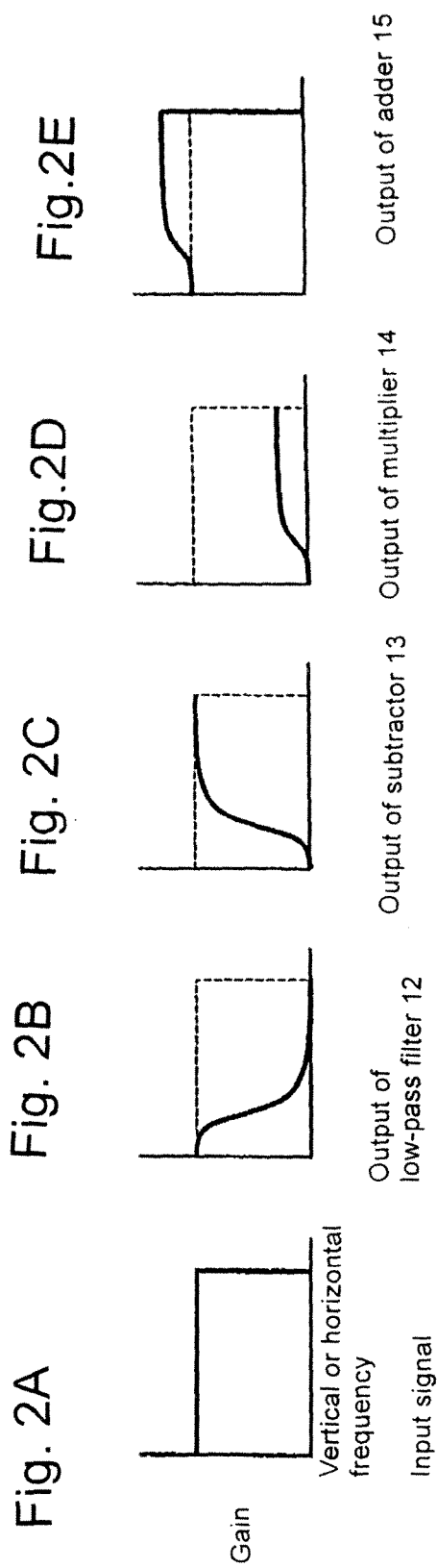
FIG. 2A is a graph representing the frequency characteristic of an input signal.
FIG. 2B is a graph representing the frequency characteristic of the output of a two-dimensional low-pass filter shown in FIG. 1.
FIG. 2C is a graph representing the frequency characteristic of the output of a subtractor shown in FIG. 1.
FIG. 2D is a graph representing the frequency characteristic of the output of a multiplier shown in FIG. 1.
FIG. 2E is a graph representing the frequency characteristic of the output of an adder shown in FIG. 1.
Figure 3:
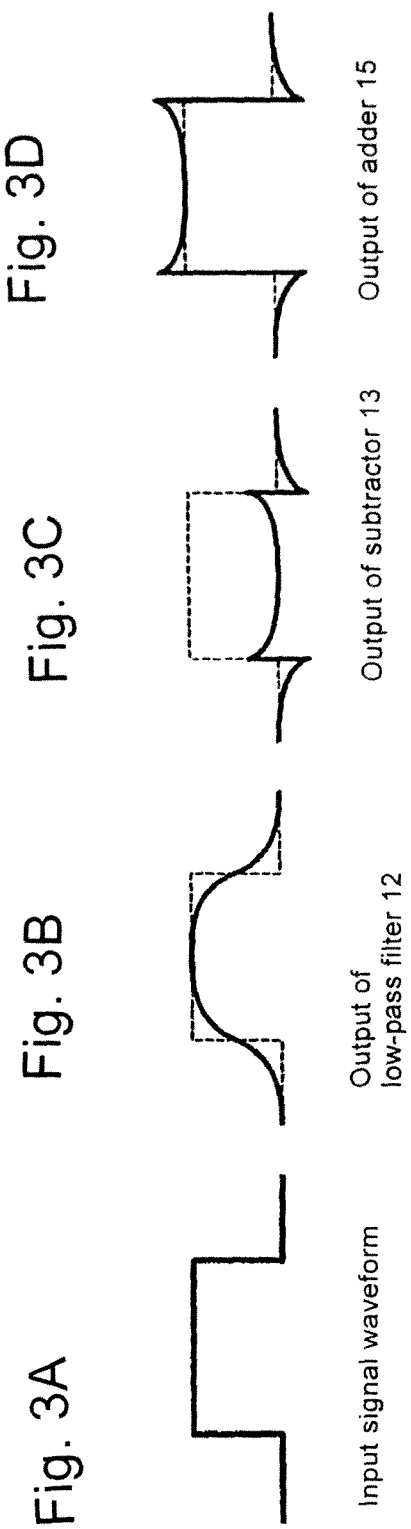
FIG. 3A is a waveform chart of an input signal.
FIG. 3B is a waveform chart representing the output of the two-dimensional low-pass filter shown in FIG. 1.
FIG. 3C is a waveform chart representing the output of the subtractor shown in FIG. 1.
FIG. 3D is a waveform chart representing the output of the adder shown in FIG. 1.

Referring now to the drawings, and more particularly to FIGS. 1-14, there are shown exemplary embodiments of the method and apparatus of the present invention.

FIG. 1 is a block diagram generally illustrating the configuration of an image quality improving apparatus according to an exemplary embodiment of the present invention. Referring to FIG. 1, the image quality improving apparatus of this exemplary embodiment may include frame memory 11, two-dimensional low-pass filter 12, subtractor 13, multiplier 14, and adder 15.

Video signal S fed from input terminal IN is supplied to frame memory 11, subtractor 13, and an adder 15, respectively. Here, the video signal supplied to frame memory 11 is designated by reference S1; the video signal supplied to subtractor 13 is designated by reference S2; and the video signal supplied to adder 15 is designated by reference S3.

Frame memory 11 delays video signal S1 supplied from input terminal IN in units of frames. Frame memory 11 can delay video signal S1 by n (n being a natural number) frames.

Video signal S1 is supplied to two-dimensional low-pass filter 12 after it has been delayed by frame memory 11.

Two-dimensional low-pass filter 12, which may include a linear phase finite impulse response (FIR) filter or an infinite impulse response (IIR) filter, cuts high frequency components of video signal S1 delayed by n frames in each of the horizontal direction and vertical directions to extract two-dimensional low frequency components. The two-dimensional low frequency components extracted by two-dimensional low-pass filter 12 are supplied to subtractor 13. Here, the vertical direction and horizontal direction of a video signal correspond to a horizontal direction and a vertical direction of an image displayed by the video signal.

Subtractor 13 subtracts the two-dimensional low frequency components extracted from video signal S1, which has been delayed by n frames, supplied from two-dimensional low-pass filter 12 from video signal S2 supplied from input terminal IN, to extract three-dimensional high frequency components. Here, the three-dimensional high frequency components include three elements which consist of a horizontal component, a vertical component, and a temporal component. The three-dimensional high frequency components extracted by subtractor 13 are supplied to adder 15 through multiplier 14.

Multiplier 14 adjusts the amplitude of the output (three-dimensional high frequency components) of subtractor 13 in accordance with a control signal supplied from an external controller (not shown). Adder 15 adds the three-dimensional high frequency components, the amplitude of which has been adjusted by multiplier 14, to video signal S3 supplied from input terminal IN.

The amount of the three-dimensional high frequency components added to video signal S3 can be freely adjusted by a control signal supplied to multiplier 14. The amount by which the amplitude is adjusted in multiplier 14 can be set as appropriate by the user through an input device of the external controller, not shown.

Next, a specific description will be given of the operation of each component in the image quality improving apparatus of this exemplary embodiment. First, the operation of two-dimensional low-pass filter 12, subtractor 13, multiplier 14, and adder 15 will be described as a basic operation in the image quality improving apparatus which does not have frame memory 11.

FIGS. 2A-2E illustrate the frequency characteristic of the output of each of two-dimensional low-pass filter 12, subtractor 13, multiplier 14, and adder 15. Video signal S fed from input terminal IN has a constant gain over the range which extends from low frequencies to high frequencies, as shown in FIG. 2A. Two-dimensional low-pass filter 12 cuts a high frequency band of the input video signal to pass therethrough only a low frequency band, as shown in FIG. 2B.

Subtractor 13 cuts a low frequency band of the input video signal to pass a high frequency band, as shown in FIG. 2C. Multiplier 14 gives a substantially constant gain in a high frequency band, as shown in FIG. 2D. Adder 15 adds the gain provided by multiplier 14 to the input video signal in the high frequency band, as shown in FIG. 2E.

FIGS. 3A-3D illustrate the output waveform of each of two-dimensional low-pass filter 12, subtractor 13, and adder 15. FIG. 3A is a signal waveform of video signal S fed from input terminal IN in the horizontal or vertical direction. When a video signal represented by such a signal waveform is displayed, a displayed image has, for example, a rectangular white area at the center, and a black area around the white area. A leading edge and a falling edge of the input signal waveform in FIG. 3A represent boundaries between the white area and black areas on the displayed image.

Since two-dimensional filter 12 passes only low frequency components as shown in FIG. 2B, its output waveform has blunted edges of the input signal waveform shown in FIG. 3A (e.g., signal waveform of low frequency components), as shown in FIG. 3B. Since subtractor 13 subtracts the output waveform of two-dimensional low-pass filter 12 shown in FIG. 3B from the input signal waveform shown in FIG. 3A, the resulting output waveform appears to be an edge signal waveform (e.g., a signal waveform of high frequency components) for emphasizing the leading edge and falling edge of the input video signal.

Since adder 15 adds the edge signal waveform shown in FIG. 3C to the input signal waveform shown in FIG. 3A, the resulting output waveform emphasizes the leading edge and falling edge of the input video signal, as shown in FIG. 3D. By thus emphasizing the edges of the input video signal, sharpness is improved at the boundaries between the white area and the black area on the displayed image.

Figure 4:
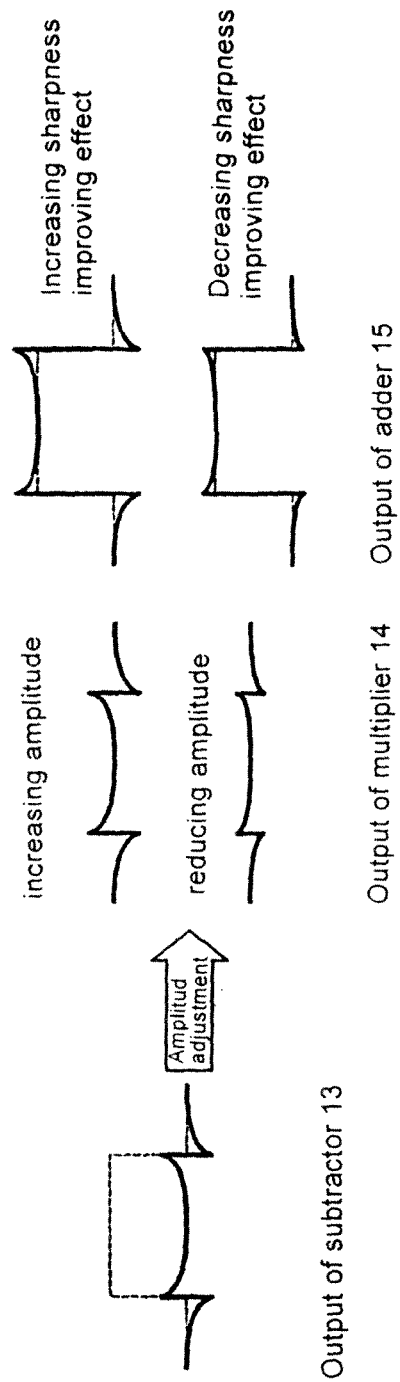
FIG. 4 is a schematic diagram describing how an amplitude is adjusted by the multiplier shown in FIG. 1.

The output waveform (e.g., edge signal) of subtractor 13 is adjusted in amplitude by multiplier 14. FIG. 4 schematically shows how the amplitude is adjusted by multiplier 14. As shown in FIG. 4, multiplier 14 adjusts the amplitude of the output waveform (edge signal) of subtractor 13 in accordance with a control signal from the outside. As the amplitude is increased, the edges are emphasized more on the output waveform of adder 15. As a result, the sharpness is better improved for the edges on the displayed image. Conversely, as the amplitude is reduced, the edges are less emphasized in the output waveform of adder 15, so that the sharpness is less improved for the edges on the displayed image.

The image quality improving apparatus of this embodiment, which is characterized by taking advantage of the principle of the aforementioned sharpness improving effect to reduce the sense of halation in a moving image, has a high-frequency component extractor for extracting three-dimensional high frequency components which includes blocks including frame memory 11, two-dimensional low-pass filter 12, and subtractor 13 as a construction for obtaining such a sharpness improving effect.

In the high-frequency component extractor, two-dimensional filter 12 extracts two-dimensional (e.g., horizontal/vertical) low frequency components from video signal S1 which has been delayed by n frames by frame memory 11, and subtractor 13 subtracts the two-dimensional low frequency components subtracted by two-dimensional low pass filter 12 from video signal 32 to extract three-dimensional high frequency components. Since video signal S1 is delayed by n frames with respect to video signal S2, subtractor 13 subtracts the two-dimensional low frequency components, which are extracted from the video signal of a current frame, from a video Signal which is supplied n frames after the current frame.

For example, when video signal S1 is delayed by one frame with respect to video signal S2 in frame memory 11, subtractor 13 subtracts two-dimensional low frequency components, extracted from a video signal of an n-th frame, from a video signal of an (n+1)th frame. In this way, the three-dimensional high frequency components are extracted.

The three-dimensional high frequency components extracted by the high-frequency component extractor are adjusted in amplitude by multiplier 14, and then the adjusted three-dimensional high frequency components are added to video signal S3 in adder 15. Since video signal S1 is delayed by n frames with respect to video signal S3, adder 15 adds the three-dimensional high frequency components to video signal S3 which is supplied with n frames after video signal S1.

For example, when video signal S3 is delayed by one frame with respect to video signal S3 in frame memory 11, where subtractor 13 subtracts two-dimensional low frequency components, extracted from a video signal of an n-th frame, from a video signal of an (n+1)th frame to extract three-dimensional high frequency components, adder 15 adds the three-dimensional high frequency components extracted by subtractor 13 to the video signal of the (n+1)th frame. In this way, the addition of the three-dimensional high frequency components to the video signal results in a reduction in the blur in a moving image due to retinal after-images.

Next, a description will be given of the principle of reducing the blur in a moving image due to retinal after-images.

Taking into consideration the blur in a moving image in terms of the frequency characteristic in the temporal direction, when the frame frequency is 60 Hz, sampling frequency fs in the temporal direction is determined to be 60 Hz, and the frequency of the most rapidly moving image that can be represented is determined to be fs/2 (=30 Hz). In this event, the hold-type drive display apparatus experiences a reduction in the high frequency characteristic due to the aperture effect. This reduction in the high frequency characteristic is observed as a blur in a moving image (see "Introduction to Digital Signal Processing," *CQ Publishing*, first edited in 1989, p. 75).

Figure 5:
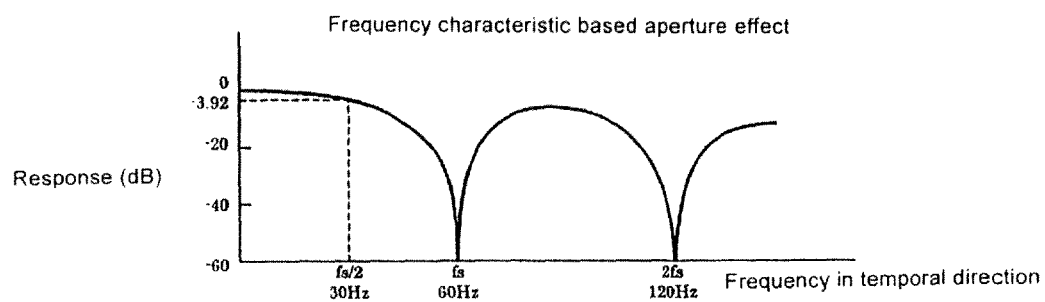
FIG. 5 is a diagram describing a frequency characteristic in a temporal direction in the three-dimensional frequency characteristics of an image.

FIG. 5 shows the frequency characteristic in the temporal direction of three dimensional frequency characteristics of an image. Referring to FIG. 5, it can be seen that the aperture effect causes a reduction in response by −3.92 dB at frequency of 30 Hz. Here, the aperture effect refers to a phenomenon in digital signal processing in which the high frequency characteristic is reduced because the output waveform of a D/A converter, which converts an impulse response to a digital signal, is in a step-shaped waveform that results from a convolution of a rectangular wave into the impulse.

Figure 6:
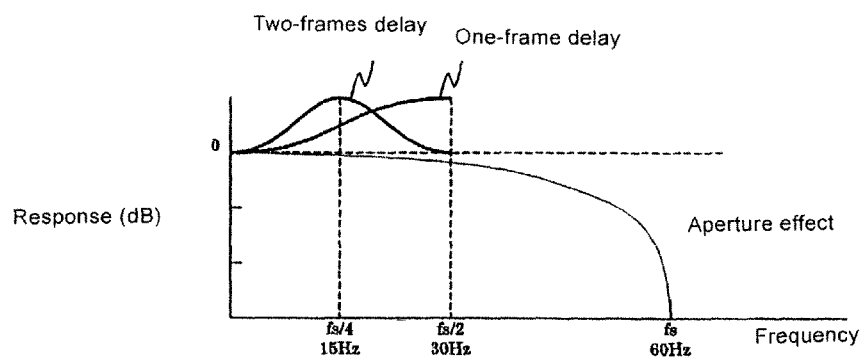
FIG. 6 is a diagram describing the frequency characteristic in the temporal direction of an image when an input video signal is displayed after three-dimensional high frequency components are added thereto.

In this embodiment, the three-dimensional high frequency components extracted by the high-frequency component extractor are added to the input video signal by adder 15. FIG. 6 shows the frequency characteristic of an image in the temporal direction when the input video signal, to which the three-dimensional high frequency components have been added, is displayed. The addition of the three-dimensional frequency components to the input video signal acts to be in opposite phase to retinal after-image components, thereby restraining the reduction in the high frequency characteristic due to the aperture effect.

The frequency characteristic of an image in the temporal direction differs depending on the number of frames by which the input video signal is delayed. When the input video signal is delayed by one frame, the frequency characteristic has a peak that is near one half of the frame frequency (=30 Hz), and when the input signal is delayed by two frames, the frequency characteristic has a peak that is near one quarter of the frame frequency (=15 Hz), as shown in FIG. 6. In any case, the addition of the three-dimensional frequency components to the input video signal acts to prevent a reduction in the high frequency characteristic that is caused by the aperture effect, i.e., restrain the occurrence of a blur in a moving image.

Figure 7:
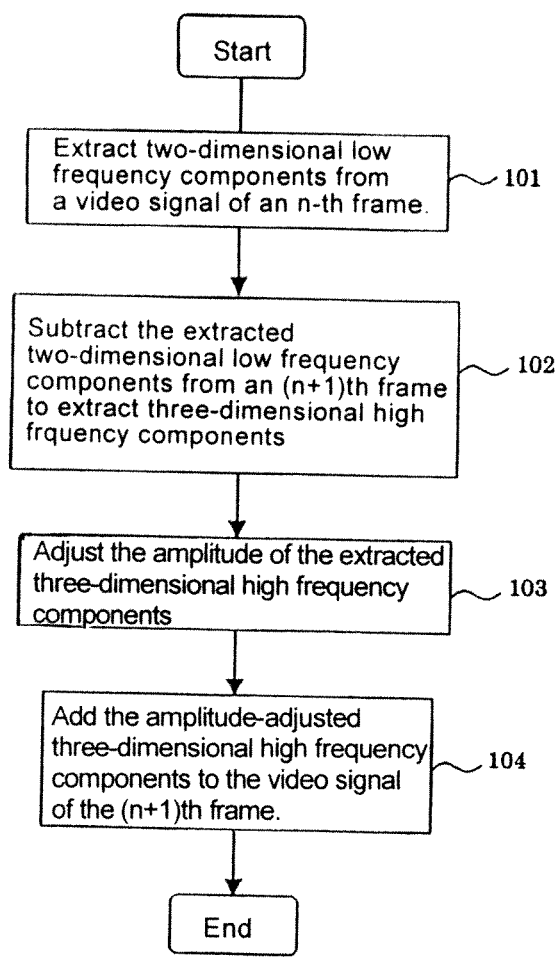
FIG. 7 is a flow chart illustrating a signal processing procedure performed in the image quality improving apparatus illustrated in FIG. 1 for delaying an image in frames.

Next, a signal processing procedure in the image quality improving apparatus of this embodiment will be described, giving an example in which an input video signal is delayed by one frame. FIG. 7 is a flow chart illustrating the signal processing procedure when an input video signal is delayed by one frame. Referring to FIG. 7, two-dimensional low-pass filter 12 may extract two-dimensional low frequency components from a video signal of an n-th frame (step 101).

Next, subtractor 13 subtracts the two-dimensional low frequency components extracted by two-dimensional filter 12 from a video signal of an (n+1)th frame to extract three-dimensional high frequency components (step 102). Then, after multiplier 14 adjusts the amplitude of the three-dimensional high frequency components extracted by subtractor 13 (step 103), adder 15 adds the amplitude adjusted three-dimensional high frequency components to the video signal of the (n+1)th frame (step 104).

When an input video signal is delayed by two frames, subtractor 13 subtracts two-dimensional low frequency components extracted by two-dimensional low-pass filter 12 from a video signal of an (n+2)th frame to extract three dimensional high frequency components at step 102, and adder 15 adds the amplitude adjusted three-dimensional high frequency components to the video signal of the (n+2)th frame at step 104.

An input video signal may be delayed by any number of frames in frame memory 11. The larger the number of frames delayed in frame memory 11, the slower the movement with regard to an object that will experience a reduced blur effect in the moving image. Accordingly, when the blur reduction effect is desired for rapid movements, the input video signal must be delayed by a smaller number of frames.

The image quality improving apparatus of this embodiment described above is an example of the present invention, and may be designed in any configuration as long as it can extract high frequency components associated with a video signal of an n-th (n is a natural number) frame, and as long as it can add the extracted high frequency components to a video signal of an (n+m)th (m is a natural number) of frame.

For example, frame memory 11, which serves as delay means, may be disposed on the output side of two-dimensional low-pass filter 12. In this modification, three-dimensional high frequency components are also added to an input video signal in the manner described above.

Alternatively, frame memory 11 may be disposed between subtractor 13 and multiplier 14 or may be disposed on the output side of multiplier 14. In this modification, subtractor 13 extracts two-dimensional high frequency components, and the extracted two-dimensional high frequency components are delayed by the number of frames in frame memory 11. This operation will be described below giving an example in which the two-dimensional high frequency components are delayed by one frame.

First, two-dimensional low-pass filter 12 extracts two-dimensional low frequency components from a video signal of an n-th frame. Next, subtractor 13 subtracts the two-dimensional low frequency components, extracted by two-dimensional low-pass filter 12, from the video signal of the n-th frame to extract two-dimensional high frequency components. Then, after multiplier 14 adjusts the amplitude of the two-dimensional high frequency components extracted by subtractor 13, adder 15 adds the amplitude adjusted high frequency components to a video signal of an (n+1)th frame.

Also, in this embodiment, high frequency components are extracted for both the horizontal and vertical directions, but high frequency components may be extracted for either the horizontal or vertical direction. In this modification, a blur in a moving image can be restrained in either the horizontal or the vertical direction.

Also, in the output signal of subtractor 13 (see the output waveform in FIG. 3C), the correction may be omitted on the positive side (white level side) or negative side (e.g., black level side). For example, when an after-image is conspicuously observed as a white blurred image on the black screen, the image may be processed only with a correction on the negative side (black level side) while omitting a correction on the positive side (white level side).

Next, a description will be given of examples of the low-frequency component extractor, which may include frame memory 11 and low-pass filter 12, of the image quality improving apparatus according to the foregoing embodiment.

[Example 1]

Figure 8:
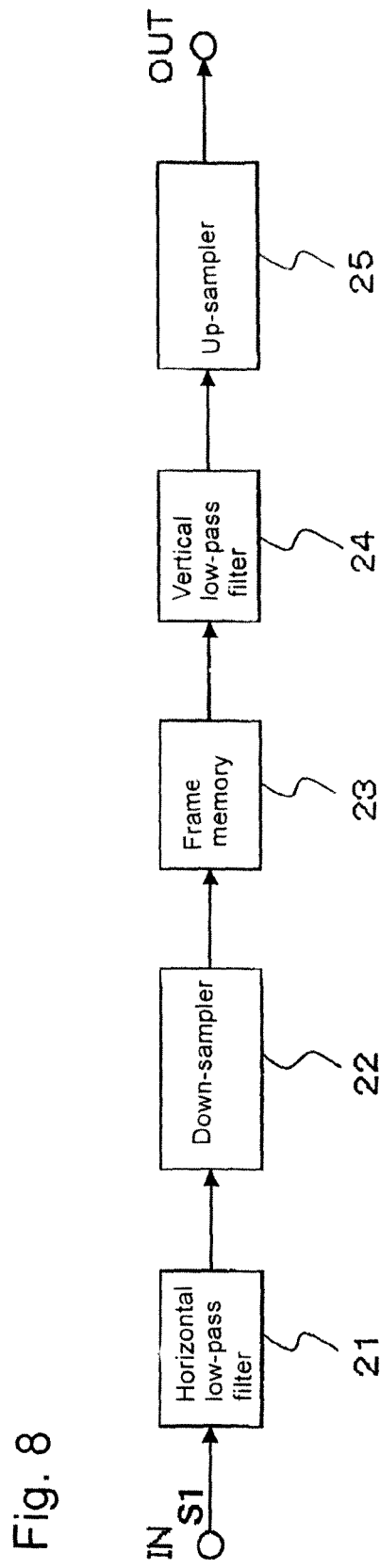
FIG. 8 is a block diagram illustrating the configuration of part of an image quality improving apparatus according to a first example of the present invention.

FIG. 8 is a block diagram illustrating the configuration of part of the image quality improving apparatus according to a first example of the present invention. The configuration illustrated in FIG. 8 may correspond to the configuration which includes frame memory 11 and two-dimensional low-pass filter 12 shown in FIG. 1, and includes horizontal low-pass filter 21, down-sampler 22, frame memory 23, vertical low-pass filter 24, and up-sampler 25.

Horizontal low-pass filter 21 extracts horizontal low frequency components from a video signal supplied from input terminal IN. A video signal which includes the horizontal low frequency components extracted by horizontal low-pass filter 21 is supplied to down-sampler 22.

Down-sampler 22 reduces the sampling rate of the video signal. Specifically, in down-sampler 22, when reducing the sampling rate to one half, frequency bands are limited by a low-pass filter such that the frequency components of the input signal fall within the reduced band, and then, data is alternately deleted (e.g., pruning of data). This results in a doubled data interval time, and the sampling frequency is reduced to one half. The video signal down-sampled by down-sampler 22 is supplied to frame memory 23.

Frame memory 23 delays the down-sampled video signal in units of frames. The video signal delayed by a number of frames by frame memory 23 is supplied to vertical low-pass filter 24. Vertical low-pass filter 24 extracts vertical low frequency components of the video signal delayed in units of frames. The video signal comprised of the vertical low frequency components extracted by vertical low-pass filter 24 is supplied to up-sampler 25.

Up-sampler 25 returns the down-sampled video signal supplied from vertical low-pass filter 24 to the original sampling rate. The video signal up-sampled by up-sampler 25 (e.g., which may correspond to a video signal of two-dimensional frequency components extracted from the video signal delayed in units of frames) is supplied to subtractor 13 shown in FIG. 1. The subsequent operation may be similar to (e.g., the same as) that in the configuration illustrated in FIG. 1.

In this example, horizontal low-pass filter 21 additionally provides the function of an aliasing distortion removing filter which may be required to down-sample a video signal in down-sampler 22. Here, the aliasing distortion removing filter is a low-pass filter for blocking high frequency components such that frequency components of an input signal fall within the band after the down-sampling. Horizontal low-pass filter 21 may be required to have a high-frequency blocking characteristic needed for the down-sampling.

Further, in this example, down-sampler 22 is disposed on the input side of frame memory 23 and frame memory 23 delays a video signal down-sampled by down-sampler 22 in units of frames. Thus, frame memory 23 can be reduced in memory capacity by a reduction in the sampling rate. Further, since a lower sampling rate results in a lower operating frequency of frame memory 23, design constraints, which may be required due to a high operating frequency, are mitigated. In addition, when frame memory 23 is shared by other circuits, frame memory 23 is occupied for a shorter time at a lower sampling rate, thus permitting other circuits to use frame memory 23 for a longer time.

In addition, since vertical low-pass filter 24 extracts vertical low frequency components of the down-sampled video signal, the circuit size of vertical low-pass filter 24 can be reduced by a reduction in the sampling rate.

The configuration of the example described above is an example, and can be modified as appropriate. For example, horizontal low-pass filter 21 and vertical low-pass filter 24 may change places with each other. Further, frame memory 23 may be disposed on the output side of vertical low-pass filter 24.

[Example 2]

Figure 9:
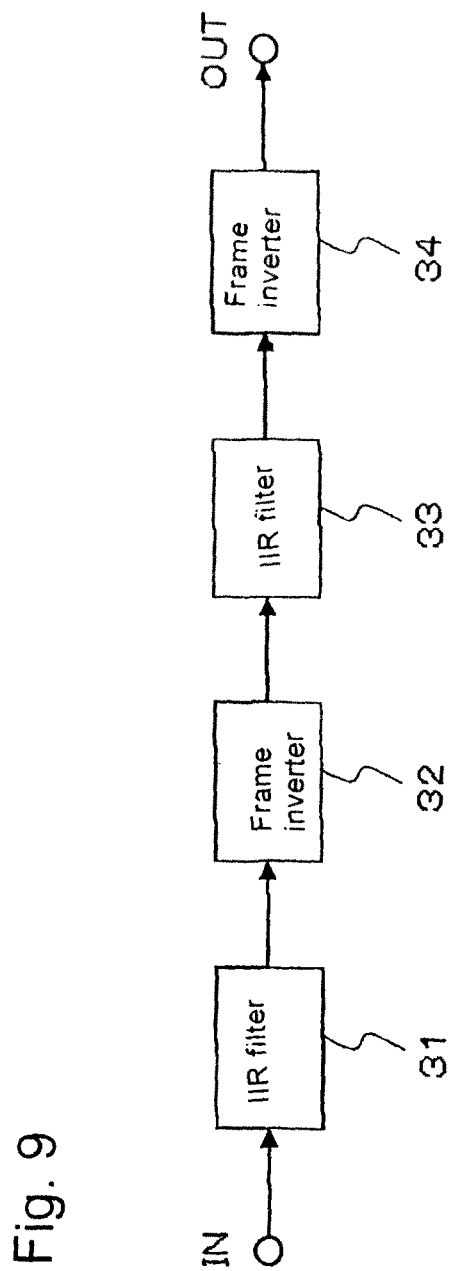
FIG. 9 is a block diagram illustrating the configuration of part of an image quality improving apparatus according to a second example of the present invention.

FIG. 9 is a block diagram illustrating the configuration of part of an image quality improving apparatus according to a second exemplary aspect of the present invention. The configuration illustrated in FIG. 9 may correspond to the configuration which includes frame memory 11 and two-dimensional low-pass filter 12 shown in FIG. 1, and may include IIR filters 31, 33 and frame inverters 32, 34.

Figure 10:
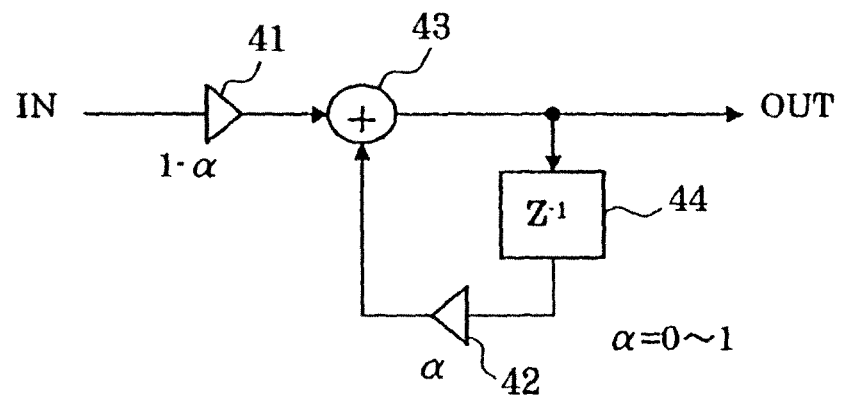
FIG. 10 is a block diagram illustrating the configuration of an infinite impulse response (IIR) filter.
Figure 11:
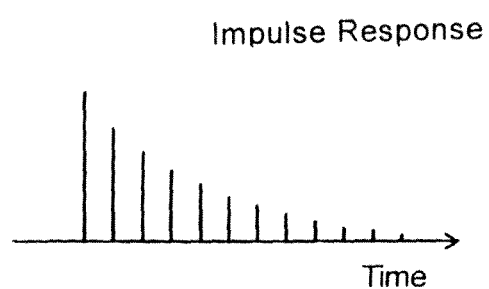
FIG. 11 is a graph representing an impulse response of the IIR filter illustrated in FIG. 10.

IIR filters 31, 33 may include (e.g., may each include) a general low-pass filter which includes a circular filter. FIG. 10 illustrates a configuration of an IIR filter, and FIG. 11 shows the impulse response thereof. As illustrated in FIG. 10, the IIR filter comprises two coefficient multipliers 41, 42, adder 43, and delay element 44.

The output of coefficient multiplier 41 is supplied to one input of adder 43. The output of adder 43 is branched into two, one of which provides output OUT, and the other of which is supplied to delay element 44. The output of delay element 44 is supplied to the other input of adder 42 through coefficient multiplier 42.

When the IIR filter is applied to processing in the horizontal direction, delay element 44 is treated as a delay element in units of sampling pixels. On the other hand, when the IIR filter is applied to processing in the vertical direction, delay element 44 is treated as a line memory in units of horizontal lines.

In the IIR filter configured as described above, the impulse response of the IIR is not in linear phase as shown in FIG. 11 (the impulse response is not in bilateral symmetry), so that the filter can be operated only in a temporally delaying direction. Accordingly, by inverting the video signal in a time-axis direction, the IIR filter can be forced to operate equivalently in the forward and backward temporal directions.

FIGS. 12A-12D schematically shows processing when the IIR filter is forced to operate equivalently in the forward and backward temporal directions. When IIR filtering is applied to a rectangular input signal as shown in FIG. 12A, corruptions in the waveform are produced in a temporally delaying direction on a leading and a falling edge of the rectangular wave, as shown in FIG. 12B. The corrupted waveform is reversed in a time-axis direction to obtain a waveform as shown in FIG. 12C. When the IIR filtering is again applied to the waveform, which is reversed in a time-axis direction, a waveform as shown in FIG. 12D is produced, thus making it possible to accomplish a linear phase.

This example may utilize processing as shown in FIGS. 12A-12D. Specifically, IIR filter 31 extracts low frequency components of an input video signal supplied on a frame-by-frame basis; frame inverter 32 inverts, in a time-axis direction, the video signal which has the low frequency components extracted by IIR filter 31; IIR filter 33 extracts low frequency components of the video signal which is reversed by frame inverter 31 in a time-axis direction; and frame inverter 34 inverts, in a time-axis direction, the video signal which has the low frequency components extracted by IIR filter 33.

IIR filters 31, 33 perform filtering in the horizontal direction or vertical direction, or in both the horizontal and vertical directions. Here, filtering in both the horizontal and vertical directions can be accomplished by connecting a horizontal IIR filter and a vertical IIR filter in cascade.

In frame inverter 32, the inversion of the video signal in a time-axis direction is performed by inverting the vertical direction and horizontal direction of the video signal using a frame memory. On the other hand, in frame inverter 34, the time base inverted by frame inverter 32 is returned to the former state by inverting the vertical direction and horizontal direction of the video signal using a frame memory.

Figure 13A:
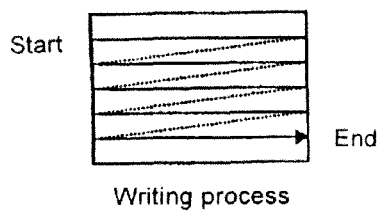
FIG. 13A is a schematic diagram for describing an operation for writing data into a frame memory in a time base inverting operation using the frame memory.
Figure 13B:
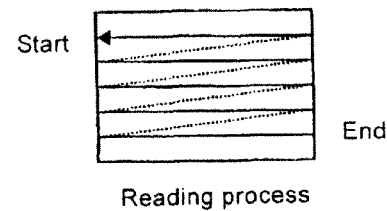
FIG. 13B is a schematic diagram for describing an operation for writing data from the frame memory in the time base inverting operation using the frame memory.

FIG. 13 schematically shows a time-axis inverting operation using a frame memory. When data is written into the frame memory on a line-by-line basis from upper left to lower right as shown in FIG. 13A, the time-axis can be inverted by reading the data that is stored in the frame memory from the write end position to the write start position as shown in FIG. 13B. Since the time-axis is inverted in frame inverter 32 in this manner, IIR filter 33 performs the filtering in the direction opposite to the temporal direction in which the filtering is performed in IIR filter 31.

In this example, since the frame inversion is performed twice, the video signal is delayed by two frames. Generally, in moving images, few scenes switch from one frame to another, but the subject moves continuously over several frames or more in most cases. Therefore, this example can also restrain the blur in a moving image.

The image quality improving apparatus of the present invention described above can be applied to ordinary display apparatuses, and can be particularly used in hold-type drive display apparatuses, more specifically, liquid crystal display apparatuses, in which a blur in a moving image is conspicuously generated due to retinal after-images.

Figure 14:
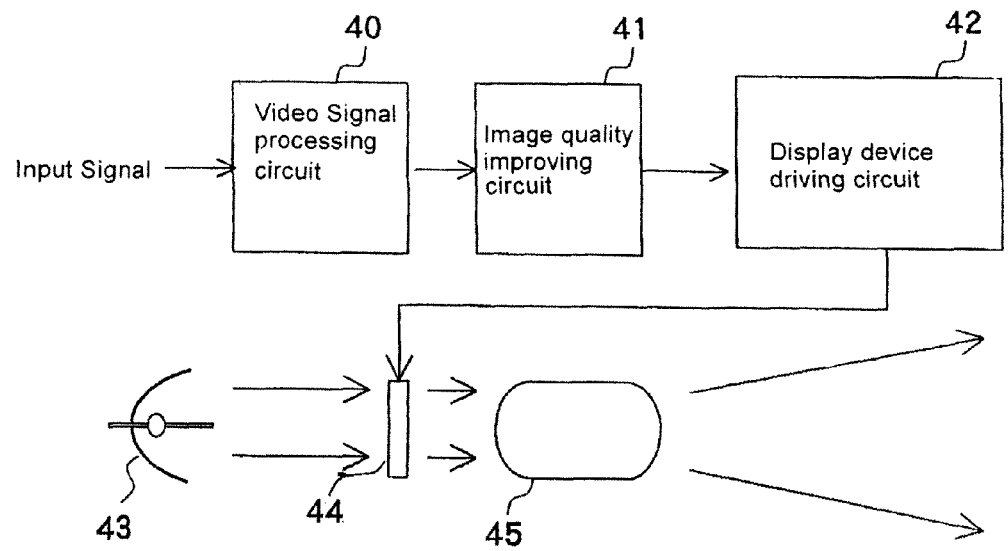
FIG. 14 is a block diagram illustrating the configuration of a display apparatus to which the image quality improving apparatus of an exemplary aspect of the present invention is applied.

FIG. 14 illustrates the configuration of a display apparatus to which the image improving apparatus of an exemplary aspect of the present invention is applied. Referring to FIG. 14, the display apparatus, which is a hold-type drive display device, may include display device 44 illuminated by light from lamp 43; lens 45 for projecting images formed by display device 44 onto a screen, not shown; video signal processing circuit 40 for processing an input signal; image quality improving circuit 41; and display device driving circuit 42 for driving display device 44.

Image quality improving circuit 41 is implemented by the image quality improving apparatus of the present invention, and the remaining components may include existing devices. In this display apparatus, a video signal is supplied from video signal processing circuit 40 to image quality improving circuit 41 which in turn improves the input video signal in image quality. Then, display device driving circuit 42 drives display device 44 based on the video signal supplied from image quality improving circuit 41.

While the foregoing description has been given in connection with the non-interlace scheme by way of example, the present invention can also be applied to an interlace scheme in which a frame is made up of odd-numbered fields and even-numbered fields. When the present invention is applied to the interlace scheme, the operation can be described by replacing "frame" with "field" in the foregoing description.

With its unique and novel features, the present invention may provide a low-cost image quality improving apparatus which is capable of restraining a blur in a moving image without reducing the luminance.

While exemplary embodiments of the present invention have been described using specific terms, such description is for illustrates purposes only, and it is to be understood that changes and variations may be made without departing from the spirit or scope of the following claims.

Further, Applicant's intent is to encompass the equivalents of all claim elements, and no amendment to any claim in the present application should be construed as a disclaimer of any interest in or right to an equivalent of any element or feature of the amended claim.

What is claimed is:

1. A method of improving an image quality of a video signal which is supplied on a frame-by-frame basis without creating a time zone in which a panel does not emit light during a period in which a frame is displayed, said method comprising:
    extracting low frequency components from a video signal of an n-th frame, where n is a natural number excluding zero;
    subtracting the extracted low frequency components from a video signal of an (n+m)th frame to produce high frequency components, where m is a natural number excluding zero; and
    adding the produced high frequency components to the video signal of the (n+m)th frame,
    wherein the extracted low frequency components comprise a horizontal component and a vertical component.

2. The image quality improving method according to claim 1, further comprising:
    extracting the low frequency components from the video signal of the n-th frame in at least one of a horizontal direction of an image displayed by the video signal, and a vertical direction of an image displayed by the video signal.

3. The image quality improving method according to claim 1, wherein two-dimensional low frequency components are subtracted from a frame signal to obtain three-dimensional high frequency components, the frame signal being different from a frame signal in which the two-dimensional low frequency components are extracted.

4. The image quality improving method according to claim 1, wherein the video signal of the n-th frame is delayed by m frames from the video signal of the (n+m)th frame.

5. The image quality improving method according to claim 1, further comprising:
    delaying the video signal of the (n+m)th frame by m frames to generate the video signal of the n-th frame before said extracting the low frequency components from the video signal of the n-th frame.

6. The image quality improving method according to claim 5, wherein the video signal of the (n+m)th comprises a same input signal which is provided for said delaying the video signal of the (n+m)th frame, for said subtracting the extracted low frequency components from the video signal of the (n+m)th frame, and for said adding the produced high frequency components to the video signal of the (n+m)th frame.

7. A method of improving an image quality of a video signal which is supplied on a frame-by-frame basis without creating a time zone in which a panel does not emit light during a period in which a frame is displayed, said method comprising:
    extracting high frequency components associated with a video signal of an n-th frame, where n is a natural number excluding zero;
    adding the extracted high frequency components to a video signal of an (n+m)th frame, where m is a natural number excluding zero,
    wherein the high frequency components extracted from the n-th frame comprise a horizontal component and a vertical component, the high frequency components added to the (n+m)th frame thereby making the (n+m)th frame three-dimensional, having horizontal, vertical, and temporal components, and
    wherein said extracting high frequency components comprises subtracting two-dimensional low frequency components from the video signal of the n-th frame to produce the three-dimensional high frequency components; and
    extracting low frequency components from the video signal of the n-th frame; and
    subtracting the extracted low frequency components from the video signal of the n-th frame to produce the high frequency components.

8. The image quality improving method according to claim 7, wherein said extracting the low frequency components from the video signal of the n-th frame is performed in at least one of a horizontal direction of an image displayed by the video signal, and a vertical direction of an image displayed by the video signal.

9. An apparatus for improving an image quality of an input video signal which is supplied on a frame-by-frame basis without creating a time zone in which a panel does not emit light during a period in which a frame is displayed, said apparatus comprising:
    a low frequency component extractor that extracts low frequency components from a video signal of an n-th frame, where n is a natural number excluding zero;
    a subtractor that subtracts the low frequency components extracted by said low frequency component extractor from the input video signal of an (n+m)th frame to extract the high frequency components, where m is a natural number excluding zero; and
    an adder that adds the high frequency components to the input video signal of the (n+m)th frame,
    wherein the extracted low frequency components comprise a horizontal component and a vertical component.

10. The image quality improving apparatus according to claim 9, wherein said low frequency component extractor comprises:
    a frame memory to delay the input video signal supplied on a frame-by-frame basis in units of frames; and
    a low-pass filter that extracts low frequency components from the video signal delayed by said frame memory.

11. The image quality improving apparatus according to claim 10, wherein said low-pass filter extracts the low frequency components from the video signal delayed by said frame memory in at least one of a horizontal direction of an image displayed by the video signal, and a vertical direction of an image displayed by the video signal.

12. The image quality improving apparatus according to claim 9, wherein said low frequency component extractor comprises:
    a horizontal low-pass filter that extracts the low frequency components of the input video signal supplied on a frame-by-frame basis in a horizontal direction of an image displayed by the video signal;
    a down-sampler that reduces a number of samples in a video signal that has the low frequency components in the horizontal direction that have been extracted by said horizontal low-pass filter;
    a frame memory to delay the video signal down-sampled by said down-sampler in units of frames;

a vertical low-pass filter that extracts the low frequency components from the video signal delayed by said frame memory in a vertical direction of the displayed image; and an up-sampler that returns a number of samples in a video signal that has the low frequency components in the vertical direction that have been extracted by said vertical low-pass filter to the original number of samples.

13. The image quality improving apparatus according to claim 9, wherein said low frequency component extractor comprises:

a first infinite impulse response (IIR) filter that extracts the low frequency components from the input video signal supplied on a frame-by-frame basis in at least one of a horizontal direction of the input video signal, and a vertical direction of the input video signal;

a first frame inverter that inverts a time-axis of a video signal that has the low frequency components that have been extracted by said first IIR filter;

a second IIR filter that extracts low frequency components from the video signal, the time-axis of which has been inverted by said first frame inverter, in at least one of a horizontal direction of the video signal, and a vertical direction of the video signal; and a second frame inverter that inverts the time-axis of a video signal that has the low frequency components that have been extracted by said second IIR filter.

14. The image quality improving apparatus according to claim 9, wherein said subtractor subtracts the low frequency components extracted by said low frequency component extractor from the video signal of the n-th frame to extract the high frequency components.

15. The image quality improving apparatus according to claim 14, wherein said low frequency component extractor extracts the low frequency components from the video signal of the n-th frame in at least one of a horizontal direction of an image displayed by the video signal, and a vertical direction of an image displayed by the video signal.

16. The image quality improving apparatus according to claim 9, wherein the video signal of the n-th frame is delayed by m frames from the input video signal of the (n+m)th frame.

17. The image quality improving apparatus according to claim 9, further comprising:

a frame memory that delays the input video signal of the (n+m)th frame by m frames to generate the video signal of the n-th frame before that said low frequency component extracts the low frequency components from the video signal of the n-th frame.

18. The image quality improving apparatus according to claim 17, wherein a same input signal comprising the input video signal of the (n+m)th frame is provided to said frame memory, said low frequency component, and said adder.

19. The image quality improving apparatus according to claim 9, wherein said low frequency components comprise two-dimensional components, and the high frequency components comprise three-dimensional components.

* * * * *